United States Patent [19]

Nohara

[11] Patent Number: 4,534,930
[45] Date of Patent: Aug. 13, 1985

[54] PROCESS FOR PRODUCING STRETCHED MULTILAYER POLYESTER BOTTLE

[75] Inventor: Shigezo Nohara, Yokohama, Japan

[73] Assignee: Toyo Seikan Kaisha, Ltd., Tokyo, Japan

[21] Appl. No.: 584,515

[22] Filed: Feb. 28, 1984

[30] Foreign Application Priority Data

Feb. 28, 1983 [JP] Japan ................... 58-31033

[51] Int. Cl.$^3$ .................. B29C 17/07; B29D 9/04; B29F 1/10
[52] U.S. Cl. ................... 264/513; 264/520; 264/521
[58] Field of Search ........... 264/512, 513, 516, 520, 264/521

[56] References Cited

U.S. PATENT DOCUMENTS 3,878,282  4/1975  Bonis et al. ............... 264/513
4,393,106  7/1983  Maruhashi et al. ......... 264/512 X

FOREIGN PATENT DOCUMENTS 2091629  8/1982  United Kingdom ......... 264/513

*Primary Examiner*—Jan Silbaugh
*Attorney, Agent, or Firm*—Sherman & Shalloway

[57] ABSTRACT

A process for producing a stretched multilayer polyester bottle which comprises axially stretching a bottomed multilayer preform comprised of an inside and an outside polyester surface layer and an interlayer of a gas-barrier resin provided therebetween optionally through an adhesive under conditions which induce molecular orientation of the polyester and simultaneously stretching it circumferentially by blowing. The multilayer preform is produced by coating a solution or emulsion of an ethylene-vinyl alcohol copolymer on one surface of a primary preform of the polyester molded in advance, drying the coated preform at a temperature at which no whitening owing to the crystallization of the polyester occurs to thereby form a thin but continuous film of the ethylene-vinyl alcohol polymer on the primary preform, mounting the coated preform on an injection mold, and injection the polyester onto the coated layer to form the inside or outside surface layer of the polyester. This process enables the ethylene-vinyl alcohol copolymer to be interposed as the interlayer of the stretched polyester bottle in a thickness which does not hamper the stretching operation but is sufficient to ensure its gas-barrier property.

5 Claims, 12 Drawing Figures

Fig. 3
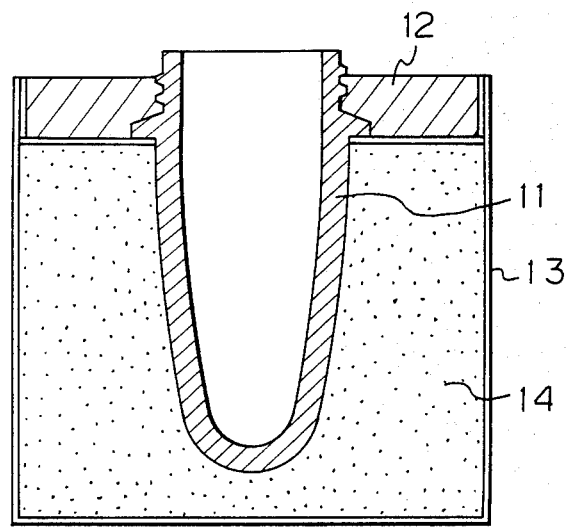
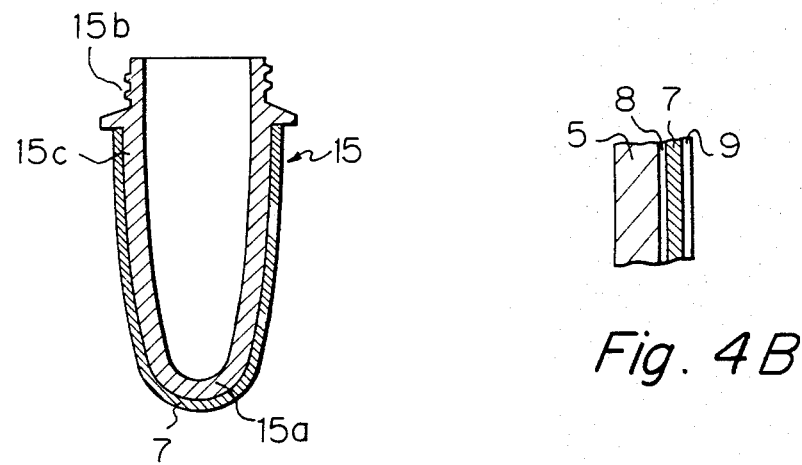
Fig. 4A
Fig. 4B

Fig. 5
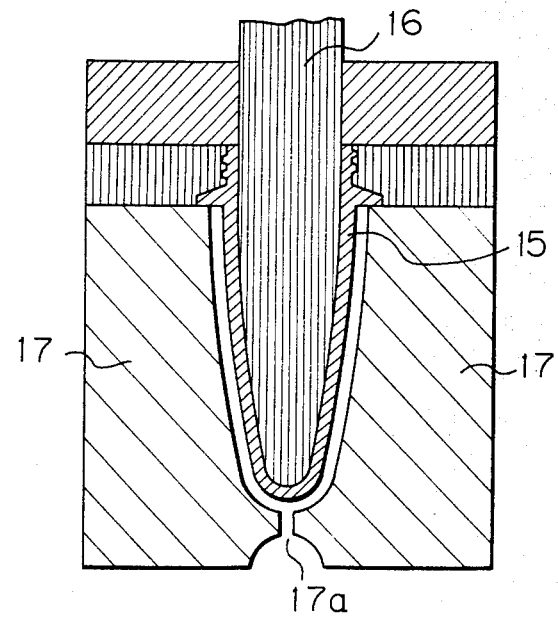
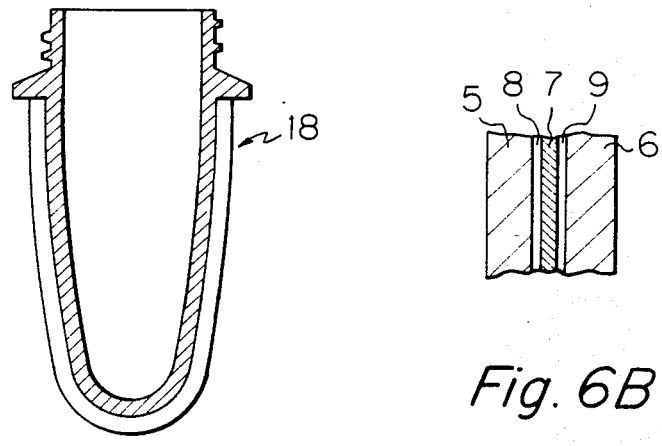
Fig. 6A
Fig. 6B

PROCESS FOR PRODUCING STRETCHED MULTILAYER POLYESTER BOTTLE

BACKGROUND OF THE INVENTION

1. Field of the Invention

This invention relates to a process for producing a stretched multilayer polyester bottle, and more specifically, to a process for producing a stretched multilayer polyester bottle the characteristic, of which lies in the production of a multilayer polyester preform.

2. Description of the Prior Art

It is known that biaxial stretching of a thermoplastic polyester capable of being oriented by stretching, such as polyethylene terephthalate, improves its appearance such as transparency, its mechanical properties such as rigidity and its dimensional stability. Biaxial stretching has long been utilized for molding of containers. A container having a biaxially oriented wall is produced by extrusion-molding or injection-molding the aforesaid thermoplastic polyester into a bottomless or bottomed cylindrical preform, and simultaneously or successively carrying out an operation of stretching the preform axially and an operation of expanding the preform circumferentially by blowing a fluid.

The biaxially stretched container has excellent transparency, rigidity, impact strength and dimensional stability, but does not prove satisfactory in its gas-barrier property. For example, a biaxially stretchable polyester such as polyethylene terephthalate, even after stretching, has a far higher oxygen permeability than a resin having high gas-barrier property such as a saponification product of an ethylene-vinyl acetate copolymer or a vinylidene chloride resin. On the other hand, the resin having high gas-barrier property is generally difficult to stretch biaxially.

It has already been known that to improve the gas-barrier property, particularly the oxygen-barrier property, of a biaxially stretched container, the orientable thermoplastic polyester is used in combination with an oxygen-barrier resin to provide a biaxially stretched multilayer container. For example, U.S. Pat. No. 3,733,309 discloses that in the production of a stretched blow-molded container from a preform of a polyester, an improvement in its gas-barrier property is expected by making the preform in a multilayer structure composed of the polyester and an ethylene-vinyl alcohol copolymer. The U.S. Patent, however, gives no specific disclosure about how this multilayer preform is produced.

For the production of a multilayer preform, multistage injection molding of a plurality of resins has previously been known (see, for example, Japanese Laid-Open Patent Publication No. 111,236/1980). The production of a multilayer preform of the aforesaid polyester and ethylene-vinyl alcohol copolymer by this multistage injection molded method gives rise to a problem in that the thickness of the ethylene-vinyl alcohol copolymer layer is difficult to adjust to not more than 1.0 mm in view of the balance between the melting—flowing and the cooling—solidification of the copolymer. The ethylene-vinyl alcohol copolymer with a thickness above 1.0 mm is very difficult to stretch under the polyester stretching conditions and economically, too, it is desired to reduce the thickness of the ethylene-vinyl alcohol copolymer layer.

Japanese Laid-Open Patent Publication No. 75826/1982 discloses a method which comprises coating a preform of an orientable thermoplastic resin such as a polyester with a solution or emulsion of a resin other than the ethylene-vinyl alcohol copolymer, for example a resin, such as a vinylidene chloride copolymer, which is impossible or difficult to heat-mold and has adhesiveness and gas-barrier property, providing a layer of the orientable thermoplastic resin further on the coated surface by injection or extrusion to form a multilayer parison, and subjecting the multilayer parison to biaxially stretching blow molding. However, by a method of forming a multilayer preform by injection molding the polyester in two stages with a step of coating the gas-barrier resin interposed therebetween, the gas-barrier resin layer at the bottom portion of the preform which is near the gate of the injection mold moves toward the neck portion by the influence of the pressure of injecting the polyester, and consequently becomes very thin. Furthermore, in the step of drying the gas-barrier resin solution or emulsion, the polyester layer may be whitened by crystallization and decrease in stretchability. Or the polyester layer will lose transparency.

The present inventor has found that these problems can all be solved by coating a solution or emulsion of an ethylene-vinyl alcohol copolymer on a primary preform of a polyester, drying the preform at a temperature at which no whitening of the polyester owing to its crystallization occurs, and thereafter injecting the polyester onto the coated film.

SUMMARY OF THE INVENTION

It is an object of this invention to provide a process for producing a stretched multilayer polyester bottle, in which a gas-barrier layer composed of an ethylene-vinyl alcohol copolymer can be interposed as an interlayer of the stretched polyester bottle in a uniform thickness which does not hamper the stretching operation but is sufficient to ensure its gas-barrier property.

Another object of this invention is to provide a process for producing a multilayer bottom preform for the production of a stretched bottle, in which the bottomed preform for stretch blowing is formed by the injection of a polyester in two stages with a step of coating a solution or emulsion of an ethylene-vinyl alcohol copolyer interposed therebetween; whitening of the polyester owing to its crystallization is prevented in the coating step; and in the final injection step, the thinning of the copolymer layer at the bottom of the preform is prevented.

Still another object of this invention is to provide a process for producing a stretched multilayer bottle which has excellent operability in stretching and can form an interlayer of an ethylene-vinyl alcohol copolymer having a relatively uniform thickness and being free from imperfections such as cracks.

According to this invention, there is provided a process for producing a stretched multilayer polyester bottle which comprises axially stretching a bottomed multilayer preform comprised of an inside and an outside polyester surface layer and an interlayer of a gas-barrier resin provided therebetween optionally through an adhesive layer under conditions which induce molecular orientation of the polyester and simultaneously stretching it circumferentially by blowing; wherein said multilayer preform is produced by coating a solution or emulsion of an ethylene-vinyl alcohol copolymer on one surface of a primary preform of the polyester molded in advance, drying the coated preform at a temperature at which no whitening owing to the crystallization of the polyester occurs to thereby form a thin but continuous film of the ethylene-vinyl alcohol polymer on the primary preform, mounting the coated preform on an injection mold, and injecting the polyester onto the coated layer to form the inside or outside surface layer of the polyester.

According to the above process, the film of the ethylene-vinyl alcohol copolymer on the primary preform is formed in such a distribution that it is thick at the bottom of the preform and thin at its side wall portion, and as a result, extreme thinning of the film at the bottom portion of the preform is prevented in the final injection step.

BRIEF DESCRIPTION OF THE DRAWNGS

FIG. 1-A is a side sectional view of a biaxially stretched multilayer molded bottle produced by the present invention;

FIG. 1-B is an enlarged sectional view of the wall of the bottle shown in FIG. 1-A;

FIG. 2-A is a sectional view of an injection molding device for a primary preform;

FIG. 2-B is a side sectional view of a primary preform molded by the device shown in FIG. 2-A;

FIG. 3 is a side sectional view of a coating pot;

FIG. 4-A is a side sectional view of a coated preform;

FIG. 4-B is an enlarged sectional view of the wall of the coated preform shown in FIG. 4-A;

FIG. 5 is a sectional view of an injection molding device for a multilayer resin;

FIG. 6-A is a side sectional view of a multilayer preform;

FIG. 6-B is an enlarged sectional view of the wall of the multilayer preform shown in FIG. 6-A;

DETAILED DESCRIPTION OF THE INVENTION

The invention will now be described in detail partly with reference to the accompanying drawings.

Figure 1A:
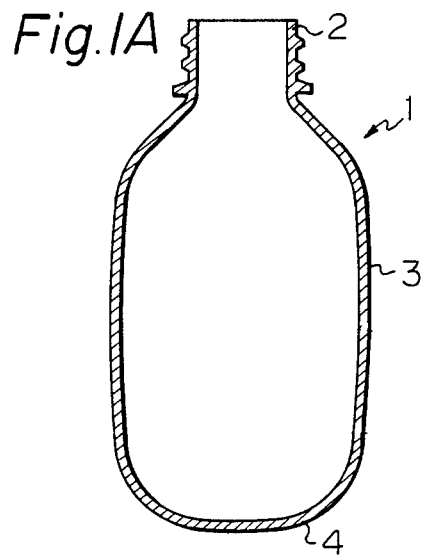
Figure 1B:
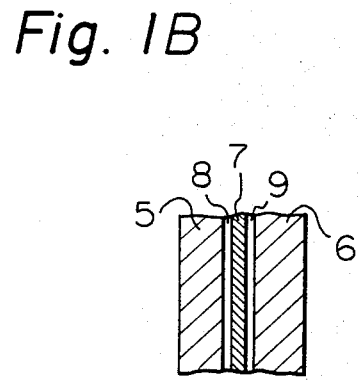

In FIG. 1 which shows a biaxially stretched multilayer molded bottle in accordance with this invention, the bottle 1 consists of a mouth portion 2 equipped with a mechanism (such as a screw or bead) for clamping a closure (not shown), a body wall portion adjoining the mouth portion through a shoulder and a bottom wall portion 4 adjoining the body wall portion.

As is clear from the sectional portion of FIG. 1, the wall of the bottle includes an inside surface layer 5 and an outside surface layer 6 each formed of a thermoplastic polyester resin, and between the surface layers 5 and 6 is interposed a gas bar barrier layer 7 composed of an ethylene-vinyl alcohol copolymer applied as a solution or emulsion. As required, adhesive resin layers 8 and 9 are provided between the gas-barrier resin layer and the two surface layers 5 and 6.

In the present invention, an ethylene-vinyl alcohol copolymer is selected as the gas-barrier resin because of its excellent gas-barrier property, and among various molecularly orientable resins, thermoplastic polyesters such as polyethylene terephthalate are selected because of their marked improvement in impact strength, rigidity, transparency, etc. by molecular orientation. Furthermore, a laminated structure composed of an inside and an outside surface layer of the polyester and an interlayer of the copolymer is employed because the gas-barrier property of the ethylene-vinyl alcohol copolymer is greatly reduced by humidity.

It is important in the present invention that a bottomed multilayer preform is used in the production of the stretched multilayer bottle. By using the bottomed preform in stretching blow molding, it can be simultaneously stretched axially by a stretching bar and circumferentially by blowing. When the ethylene-vinyl alcohol copolymer is stretched successively in two directions, cracks are seen to form in the second stretching running in a direction at right angles to the stretching direction. This is presumably because the copolymer is fibrillated in the first stretching, and cracks occur between the fibrils. In contrast, according to the process of this invention, molecular orientation in the two directions is effected with a good balance by the simultaneous biaxial stretching, and the occurrence of cracks in the interlayer is prevented.

The process steps for producing the bottle in accordance with this invention is described below with reference to FIGS. 2-A to 7.

Figure 2A:
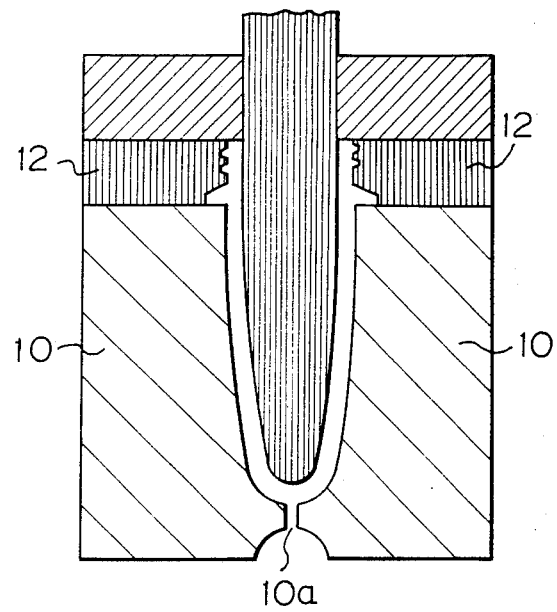
Figure 2B:
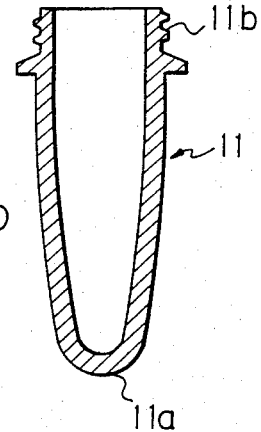

With reference to FIG. 2-A, a primary bottomed preform 11 shown in FIG. 2-B is formed by injecting a thermoplastic polyester resin into molds 10 for an inside layer from an injection-molding machine (not shown) for the inside layer. In this injection molding, an injection gate 10a is provided so as to correspond to the bottom portion 11a of the primary preform 11 in order to prevent the formation of a weld line.

Then, with reference to FIG. 3, the neck portion of the primary preform 11 is held by neck holders 12 or other means, and conveyed to a coating pot 13 in the next step. The preform 11 is dipped in the coating pot 13 to coat a solution or latex 14 of an ethylene-vinyl alcohol copolymer on its surface. Prior to the coating of the solution or latex 14, an adhesive or an anchoring agent may, if desired, be coated on the outside surface of the primary preform 11 by the same means as shown in FIG. 3.

The ethylene-vinyl alcohol copolymer advantageously has a vinyl alcohol unit content of 50 to 95 mole%, particularly 55 to 85 mole%, in view of its gas-barrier property. One marked advantage of the present invention is that since the copolymer is applied not by heat molding but in the form of a solution or emulsion, an ethylene-vinyl alcohol copolymer having a high vinyl alcohol unit content can also be used. Naturally, this copolymer should have a molecular weight high enough to form a film, and the content of the residual vinyl ester unit is desirably not more than 4 mole%.

Any desired solvents known per se are used for the ethylene-vinyl alcohol copolymer. For example, there may be used dimethyl sulfoxide, dimethylformamide, tetrahydrofuran, isopropanol, water, or combinations of at least two of these. Among them, a mixture of water and isopropanol in a weight ratio of from 3:1 to 1:3 is especially preferred because when it remains in the final product, it does not appreciably cause an adverse effect. The copolymer is dissolved under heat in the solvent. The solution is used for coating, if required while maintaining it at a high temperature below 100° C. The ethylene-vinyl alcohol copolymer can also be used in the form of an emulsion or latex suspended in an aqueous medium by an emulsifier. The latex particles may have a diameter of 0.05 to 1.0 microns. There is no particular restriction on the concentration of the copolymer in the solution or latex. Generally, it is 1 to 60% by weight, preferably 2 to 50% by weight.

The solution or latex of the copolymer may be applied by dip coating, spray coating, electrostatic coating, roll coating, brush coating, etc.

In the present invention, the wet film formed is dried at a temperature at which no whitening owing to the crystallization of the polyethylene occurs. As a result, a thin but continuous film of the copolymer is formed on the primary preform.

The drying treatment under the aforesaid conditions brings about two advantages. Firstly, under these conditions, whitening owing to the crystallization of the polyester of the primary preform is prevented. Consequently, the excellent operability of the preform in stretching is maintained, and the transparency of the final bottle is increased.

Secondly, coupled with the coating of the ethylene-vinyl alcohol copolymer in the form of a solution or emulsion, the drying treatment under the above conditions can give a gas-barrier layer having a uniform thickness sufficient to ensure its gas-barrier property at every part of the final bottle. When the drying is carried out at a temperature at which whitening owing to the crystallization of the polyester is prevented, the wet coated film sags by the effect of gravity to cause such a thickness distribution that the film is thin at the upper portion of the side wall portion and thick at its bottom portion. On the other hand, as already pointed out above, when the polyester is injected onto the coated layer of the ethylene-vinyl alcohol copolymer, the coated layer at the bottom portion is pushed toward the downstream side by the injecting pressure and becomes extremely thin. The present invention utilizes the sagging of the coated film toward the bottom portion, and a thick coated layer is provided in advance at the bottom portion. This successfully prevents extreme thinning of the coated film at the bottom portion incident to the injection of the polyester in the final stage, and makes the thickness of the copolymer layer in the final multilayer preform uniform.

It has been found that with regard to this feature of the present invention, satisfactory results are obtained if the coated film of the ethylene-vinyl alcohol copolymer is formed such that its thickness at the bottom portion of the preform becomes 3 to 15 times, especially 5 to 12 times, the thickness of its upper end at the side wall portion of the preform. The absolute thickness of the coated film may be 5 to 100 microns in the final preform, and 1 to 20 microns in the bottle.

As specific conditions for drying, it is necessary to dry the coated preform 15 with its bottom portion 15a directed downwardly and it neck portion 15b directed upwardly in order to provide the aforesaid thickness distribution of the coated film. In order to provide this thickness distribution of the coated film, the drying is preferably carried out at a relatively low temperature, particularly at a temperature of 70° to 130° C. for a sufficient period of time.

If one coating and drying cycle cannot still form the coated film of a sufficient thickness, this cycle may be repeated until the desired thickness is obtained.

The following resins may, for example, be cited as the adhesive resin which may, if desired, be applied to the primary preform prior to the coating of the ethylene-vinyl alcohol copolymer, or may be applied further after the coating of the copolymer.

(1) Urethane-type adhesives

Solutions of diisocyanate compounds such as tolylene diisocyanate, methylenediphenyl diisocyanate, xylylene diisocyanate, hexamethylene diisocyanate and isophorone diisocyanate and polyethers such as ethylene glycol and polyoxypropylene glycol or a polyester obtained by condensation of adipic acid and ethylene glycol in a solvent or mixed solvent selected, for example, from ethyl acetate, toluene and methyl ethyl ketone.

(2) Vinyl acetate-type aqueous emulsions (3) Ethylene-vinyl acetate type hot-melt adhesives.

(4) Urethane-type hot-melt adhesives.

For increased adhesiveness, treatment with an anchoring agent such as titanic acid esters or isocyanates is also effective.

The coated preform 15 shown in FIG. 4 is thus obtained. The coated preform 15 has a coating 7 having such a thickness distribution that it is thick at the bottom portion 15a and thin at the upper end 15c of the side wall portion. In this specific embodiment, the neck portion 15c has no coating of the ethylene-vinyl alcohol copolymer formed thereon because the polyester remains there in a large thickness.

As shown in FIG. 5, an injection molding male mold (core) 16 is inserted into the coated preform 15, and the preform 15 is set in injection molding female molds 17. From an injection machine (not shown) for an outer layer, the thermoplastic polyester is injected through a gate 17a to form a multilayer preform 18 as shown in FIG. 6. As already pointed out, the provision of the aforesaid thickness distribution in the coated layer 7 prevents the tendency of the coated layer 7 at the bottom portion of the multilayer preform 18 to be thinned extremely by the injecting pressure of the polyester resin.

By maintaining the coated preform 15 at a temperature at which the preform has elastic deformability but is not crystallized, preferably at a temperature in the range of 75° to 130° C., the injection molding male mold 16 can be inserted into the preform 15 in intimate contact therewith. If the coated preform 15 is in the solidified state without performing this temperature adjustment, the male mold 16 may not be inserted into it, or may not adhere closely to it. Consequently, the subsequent injection may sometimes be not effected accurately.

In a preferred embodiment of this invention, the injection of the polyester in the final stage is carried out by positioning the coated preform 15 in the injection molds 17 while it has such a temperature distribution that the temperature is low at the bottom portion 15a (FIG. 4) and high at the side wall portion 15c (FIG. 4). The tendency of the coated layer 7 to be thinned at the bottom portion 15a can be prevented effectively while improving the fillability of the outside polyester resin layer 6 within the cavity.

In the production of a multilayer preform by multistage injection, the entire thickness of the preform is usually restricted to below a certain value from the standpoint of operability in stretching or economy. The thickness of a layer formed by injection molding in the final stage is of course limited to a still smaller value. When this thickness exceeds 2 mm, there is no problem in the pressure flowing of the injected molten resin, and the trouble described below does not occur. In actual injection in the final stage, the distance between the primary preform and the cavity becomes much smaller than the aforesaid thickness.

In this case, the resin injected in the final stage does not completely adhere to the primary preform and a so-called short molding is likely to occur, unless the temperature of the surface of the coated preform is high to some extent. Even when the resin is injected at a high temperature into the space between the preform and the mold, the primary preform has a low temperature corresponding to the temperature of the core and the temperature of the cavity in the final stage is also low. Furthermore, if the distance between the cavity and the primary preform is short, the injected molten resin cannot be completely filled in the cavity and becomes solidified to cause a short molding.

Accordingly, to inject the resin easily into the narrow space in the second stage, it is better to elevate the temperature of the primary preform and the temperature of the cavity of the injection mold in the second stage to a moderate extent. But there is a certain limit to this. Specifically, in order to withdraw the molded article rapidly from the mold, the temperature of the core inserted in the preform and the temperature of the cavity in the final stage of injection must be below a certain point. Otherwise, the molded article sticks to the mold. Accordingly, the temperature of the primary preform must be adjusted while limiting these temperatures to below a certain point.

When the resin at very high temperature is injected in the final stage onto the primary preform, that portion of the primary preform which is near the gate of the injection mold is exposed to a high temperature and pressure. As a result, the lower end portion of the primary preform which is on the side of the injection gate is again melted, flows and becomes a thin layer. Or in an extreme case, the coated interlayer will flow away. Generally, therefore, injection of multiple layers proceeds more smoothly when the lower portion of the primary preform (inside layer) which is near the gate is cooled (although this varies with the type and the temperature of the molten resin to be injected under pressure).

As stated above, when the space between the primary preform and the mold cavity in the final injection stage is a thin and long passage, the temperature of the primary preform should better be elevated, and the lower portion of the preform should better be maintained at a low temperature. These two requirements are contradictory to each other.

In a preferred embodiment of this invention, a compromise can be set up between these contradictory requirements. Specifically, by providing the aforesaid temperature distribution in the coated preform, each of the layers of the preform can be maintained at a prescribed thickness over the entire surface of the preform without causing a short mold and while preventing the coated interlayer of the preform from becoming non-uniform in thickness.

In the present invention in which the bottle is comprised of an inside and an outside PET layer and a coated interlayer of the ethylene-vinyl alcohol copolymer, each of these layers can be controlled to a prescribed thickness while avoiding a short mold by providing such a temperature distribution that the temperature of the upper portion 15 of the primary preform held by the mold cavity is in the range of about 40° to about 80° C., especially 40° to 60° C., and the temperature of its lower portion 14 is in the range of not more than about 30° C., especially −10° to 20° C.

Polyethylene terephthalate, polybutylene terephthalate, etc. having film-forming molecular weights are conveniently used as the thermoplastic polyester constituting the inside and outside surface layers.

Polyethylene terephthalate also includes crystalline copolymers containing in the polymer chain a small amount of comonomer units, for example diols other than ethylene glycol such as propylene glycol and butylene glycol, dicarboxylic acids other than terephthalic acid such as isophthalic acid, hydroxycarboxylic acids such as p-hydroxybenzoic acid, diamines, and amino acids.

The suitble thickness of each of the inside and outside surface layers 5 and 6 is respectively 1.1 to 5.0 mm in the preform, and 100 to 500 microns in the blow-molded bottle.

Figure 7:
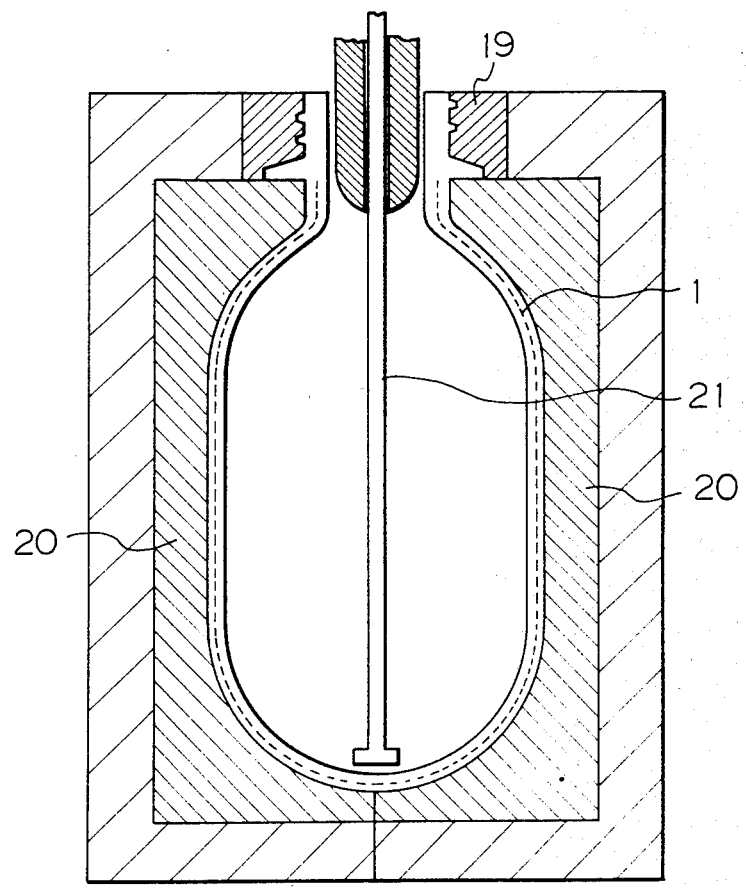
FIG. 7 is a sectional view of a stretching blow molding device.

The resulting multilayer preform 18 is conditioned to a temperature suitable for stretching blow-molding, for example to 85° to 120° C. In the blow molding device shown in FIG. 7, the multilayer preform 18 is set in blow molds 20 while its neck portion is held by a neck holder 19. While the preform 18 is stretched longitudinally by a stretching bar 21, a fluid is blown from the stretching bar 21 to stretch and blow-mold the preform 18. As a result, the biaxially stretched multilayer bottle 1 is formed.

The axial stretching and the circumferential expansion of the multilayer preform are carried out at a temperature at which the molecular orientation of the thermoplastic polyester resin effectively takes place. The stretching blow-molding temperature and the stretching ratio are known per se, and the known stretching blow molding conditions can be employed in this invention.

If in the present invention the molecules of the thermoplastic polyester resin constituting the inside and outside surface layers are oriented so as to provide an interplanar orientation coefficient (l+m) of at least 0.3, particularly at least 0.4, satisfactory results can be obtained with regard to transparency, rigidity and impact strength.

According to this invention, there is also provided a packing plastic bottle produced by the biaxially stretching blow-molding of a multilayer preform composed of an inside and an outside surface layer of a thermoplastic polyester and a gas barrier interlayer comprising an ethylene-vinyl alcohol copolymer and provided therebetween optionally through an adhesive layer and having a neck portion to be engaged with a closure, a shoulder portion, a body portion whose wall is molecularly oriented in the axial direction and a closed bottom portion, the entire neck portion and the inside wall of the bottom portion, body portion and shoulder portion being integrally molded from a thermoplastic polyester, said interlayer of the ethylene-vinyl alcohol copolymer being in the form of a continuous and seamless film extending over the bottom portion, body portion and shoulder portion with its upper end terminating immediately below the neck portion, said ethylene-vinyl alcohol copolymer layer having a thickness of 1 to 20 microns, and the neck portion and the thermoplastic polyester outside wall at the bottom portion, body portion and shoulder portion forming a seam immediately below said neck portion either directly or through said interlayer.

Figure 8:
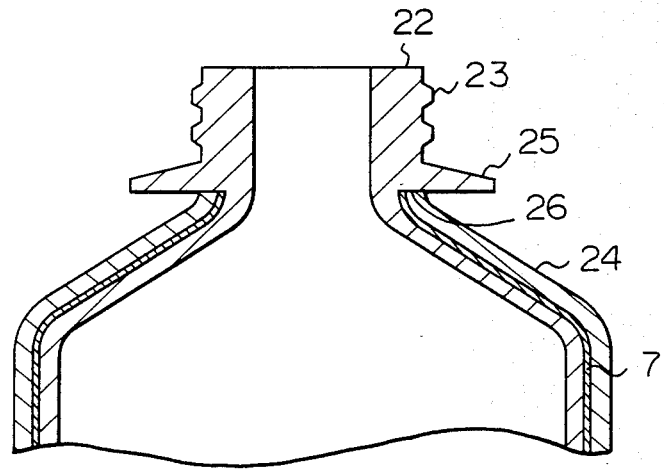
FIG. 8 is an enlarged sectional view of the vicinity of the neck portion of the bottle shown in FIG. 1.

In FIG. 8 which shows on an enlarged scale the principal parts of this bottle, i.e. this vicinity of the neck portion, in section, the neck portion 2 has formed therein an open end 22, a thread 23 to be engaged with a cap, and a supporting ring 25 downwardly in this order. As is clear from the example of producing the primary preform described above, the entire neck portion 2 and the inside wall of the shoulder portion 24, body portion and bottom portion are formed integrally of a thermoplastic polyester.

Since the primary preform is coated with a solution or emulsion of the ethylene-vinyl alcohol copolymer and dried to form a film, followed by stretching blow-molding, the interlayer 7 of this copolymer exists as a continuous and seamless complete film over the entire surface of the bottom portion, body portion and shoulder portion, and its upper end portion is provided so as to terminate immediately below the neck portion 2. Furthermore, since this film layer is formed from a solution or emulsion, it is thinner than conventional film layers of this type, and has a thickness in the range of 1 to 20 microns, especially 3 to 10 microns in the final bottle. The formation of such a thin, completely continuous interlayer has become possible for the first time by the present invention. As stated hereinabove, biaxial stretching blow-molding from a co-extrusion pipe cannot avoid the formation of a seam at the bottom of the resulting bottle, and this portion becomes defective in regard to gas barrier property. On the other hand, by an ordinary multilayer injection-molding technique, it is difficult to reduce the thickness of the interlayer to such a small range.

On the interlayer 7 is the outer wall of the thermoplastic polyester completely covering the bottom portion, the body portion and the shoulder portion, and this outer wall forms a seam 26 at the neck portion 2 and immediately below the neck portion either directly or through the interlayer.

By the aforesaid means, the present invention makes it possible to adjust the thickness of the interlayer resin layer to a desired value required for the gas barrier property of the bottle from the viewpoint of operability in stretching. Consequently, the amount of the expensive gas-barrier resin can be reduced, and the cost of the preform, and therefore the bottle, can be curtailed.

As a matter of course, the blow stretching conditions for the multilayer preform are selected so as to match the stretching conditions for the inside and outside resin layers constituting the main portion of the preform. For example, the blow stretching temperature for the multilayer polyester preform is selected within 85° to 120° C. which temperatures are suitable for the blow stretching of the polyester. On the other hand, in many cases, oxygen-barrier resins such as the ethylene-vinyl alcohol copolymer are difficult to stretch under these conditions. Since in the present invention the gas-barrier resin is sandwiched by the inside and outside polyester surface layers, the preform can be stretched with good operability without causing imperfections such as tearings, cracks and pinholes in the gas-barrier resin interlayer.

The present invention also brings about a marked advantage in that the neck portion and the inner wall are formed integrally from the polyester, and immediately below the neck portion, a seam is formed between the outside polyester layer and the polyester neck portion. In the present invention, even when the neck portion is formed only of the polyester, the amount of gas permeation through this portion is of a negligible order, befause this portion does not undergo a stretching operation and is maintained considerably thick. Moreover, since in that part of the preform which is to be reduced in thickness by stretching, a continuous complete gas-barrier resin interlayer exists up to a part just below the neck portion, gas permeation through this portion can also be restricted to a very small extent.

When the oxygen-barrier resin layer is provided over the entire preform, its end is necessarily exposed to the mouth portion of the preform, and therefore the mouth portion of the final bottle, and is directly affected by water in the bottle or the humidity of the inside of the bottle (the humidity of the inside of the bottle is considered to be 100% as a relative humidity) (the gas-barrier property of the ethylene-vinyl alcohol copolymer is markedly reduced under high humidity conditions). In contrast, according to the present invention, the exposing of this end portion to the mouth portion of the closed bottle can be prevented even if the gas-barrier resin layer exists also on the seam. This is because the neck portion and the inside layer are molded integrally, and the seam between the resin of the neck portion and the outside layer resin is formed on the periphery of the part immediately below the neck portion.

The most important feature of the present invention is that since the aforesaid seam is provided at the part immediately below the neck portion which least undergoes stretching, there is no tendency toward the occurrence of chipping, scratching, etc. at the seam portion, and a stretched blow-molded bottle having an especially good appearance can be obtained.

The following Examples illustrate the present invention more specifically.

EXAMPLE 1

A primary bottomed preform of polyethylene terephthalate (inherent viscosity 0.82) having a length of 120 mm, an inside diameter of 25 mm and a side wall thickness of 1.5 mm was formed by injection molding. While its mouth portion was held, the primary preform was dipped in the suspended state in a urethane-type adhesive solution (a solution of tolylene diisocyanate and a linear polyester in methyl ethyl ketone), and then dried with hot air at 90° C. for 2 minutes. The coated preform was then dipped in a solution of an ethylene-vinyl alcohol copolymer having a vinyl alcohol content of 82 mole % in a mixture of propanol and water and then dried with hot air at 100° C. for 1 minute. This copolymer coating—drying cycling was repeated three times. The coated product was further dipped in the aforesaid urethane-type adhesive solution and dried with hot air at 95° C. for 2 minutes. The coated film of the coated preform had a thickness gradient such that its thickness was about 6 microns near the upper end of the preform, about 18 microns at the center of the side wall portion and about 30 microns at the bottom portion.

The temperature of the coated preform was adjusted to one at which it had elastic deformability. Then, the preform was inserted into an injection mold (core) and polyethylene terephthalate having an inherent viscosity of 0.82 was injected onto the coated surface (outside surface) of the coated preform to form a multilayer preform having a side wall thickness of 3.0 mm. The coated film of the multilayer preform was thick (about 22 micron ) at its side portion which would be stretched at a high stretch ratio in bottle molding, and thin at the vicinity of its upper end and at its bottom portion at which the stretch ratio would be relatively low (about 14 micron in the vicinity of its upper end and about 18 microns at its bottom portion).

The multilayer preform was conditioned to a temperature of 95° C., and then biaxially stretched and blow-molded to give a stretched multilayer bottle having an average body thickness of about 250 microns and an inner capacity of 500 cc. The thickness of the coated film of the bottle was uniform.

The bottle had an oxygen permeability of 2.4 cc/m².day.atm. (37° C.) which was less than one-fifth of that of a bottle made from polyethylene terephthalate alone. When the bottle was let fall repeatedly 10 times, no delamination between the layers was observed.

The oxygen permeability of the bottle made from polyethylene terephthalate along was 15 cc/m².day.atm. (37° C.).

EXAMPLE 2

A primary bottomed preform of polyethylene terephthalate (inherent viscosity 0.82) having a length of 120 mm, an inside diameter of 25 mm and a side wall thickness of 1.5 mm was formed by injection molding. While its mouth portion was held, the primary preform was dipped in the suspended state in a urethane-type adhesive solution (a solution of tolylene diisocyanate and a linear polyester in methyl ethyl ketone), and then dried with hot air at 90° C. for 2 minutes. The coated preform was then dipped in a solution of an ethylene-vinyl alcohol copolymer having a vinyl alcohol content of 72 mole % in a mixture of propanol and water and then dried with hot air at 100° C. for 1 minute. This copolymer coating—drying cycle was repeated three times. The coated produce was further dipped in the aforesaid urethane-type adhesive solution and dried with hot air at 95° C. for 2 minutes. The coated film of the coated preform had a thickness gradient such that its thickness was about 5 microns near the upper end of the preform, about 15 microns at the center of the side wall portion and about 25 microns at the bottom portion.

The bottom portion of the coated preform was cooled to below 20° C., and the other part of the preform was conditioned to a temperature at which it had elastic deformability. Then, the preform was inserted into an injection mold (core) and polyethylene terephthalate having an inherent viscosity of 0.82 was injected onto the coated surface (outside surface) of the coated preform to form a multilayer preform having a side wall thickness of 3.0 mm. The coated film of a multilayer preform had a thickness of about 12 microns near the upper end of the preform, about 20 microns at the side wall portion and about 16 microns at the bottom portion.

The multilayer preform was conditioned to a temperature of about 95° C., and then biaxially stretched and blow-molded to give a stretched multilayer bottle having an average body thickness of about 250 microns and an inner capacity of 500 cc.

The bottle had an oxygen permeability of 2.9 cc/m².day.atm. (37° C.) which was less than one-fifth of that of a bottle made from polyethylene terephthalate alone. When the bottle was let fall repeatedly 10 times, no delamination between the layers was observed.

COMPARATIVE EXAMPLE

A primary bottomed preform of polyethylene terephthalate (inherent viscosity 0.82) having a length of 120 mm, an inside diameter of 25 mm and a side wall thickness of 1.5 mm was formed by injection molding. The primary preform was then dipped in a solution of an ethylene-vinyl alcohol copolymer having a vinyl alcohol content of 72 mole % in a mixture of propanol and water, and dried with hot air at 150° C. for 2 minutes. This copolymer coating—drying cycle was repeated three times to form a coated layer of a uniform thickness. The thickness of the coated film of the coated preform was about 15 microns on an average. But its surface was crystallized and became slightly whitened.

The coated preform was inserted into an injection mold, the polyethylene terephthalate having an inherent viscosity of 0.82 was injected onto the coated surface (outside surface) of the coated preform to form a multilayer preform having a side wall thickness of 3.0 mm. The coated film of the multilayer preform had such a thickness distribution that its thickness was about 20 microns near the upper end of the preform, about 25 microns at the center of the side walls portion, and about 3 microns at the bottom portion.

The multilayer preform was conditioned to a temperature of 95° C., and then biaxially stretched and blow-molded to give a stretched multilayer bottle having an average body thickness of about 250 microns and an inner capacity of 500 cc. But the operability of stretching blow-molding was poor, and the bottle had poor transparency.

The coated film of this bottle was non-uniform, and its oxygen permeability of the bottle was 5.8 cc/m².day.atm. (37° C.).

What is claimed is:

1. A process for producing a stretched multilayer polyester bottle which comprises axially stretching a bottomed multilayer preform comprised of an inside and an outside polyester surface layer and an interlayer of a gas-barrier resin provided therebetween optionally through an adhesive layer under conditions which induce molecular orientation of the polyester and simultaneously stretching it circumferentially by blowing; wherein said multilayer preform is produced by coating a solution or emulsion of an ethylene-vinyl alcohol copolymer on one surface of a primary preform of the polyester molded in advance, drying the coated preform at a temperature at which no whitening owing to the crystallization of the polyester occurs to thereby form a thin but continuous film of the ethylene-vinyl alcohol polymer on the primary preform, the coated film of the ethylene-vinyl alcohol copolymer having such a thickness distribution that its thickness at the bottom portion of the preform is greater than the thickness of its upper end at the side wall portion of the preform sufficient to prevent extreme thinning of the coated film at the bottom portion incident to the subsequent injecting step, mounting the coated preform on an injection mold, and injecting the polyester onto the coated layer to form the inside or outside surface layer of the polyester.

2. The process of claim 1 wherein the ethylene-vinyl alcohol copolymer has a vinyl alcohol unit content of 50 to 95 mole %.

3. The process of claim 1 wherein the coated film of the ethylene-vinyl alcohol copolymer has such a thickness distribution that its thickness at the bottom portion of the preform becomes 3 to 15 times the thickness of its upper end at the side wall portion of the preform.

4. The process of claim 1 wherein the injection of the polyester in the final stage is carried out while the coated preform is positioned in the injection mold such that its bottom portion is maintained at a low temperature and the upper part of its side wall portion is maintained at a high temperature.

5. The process of claim 4 wherein the coated preform has such a temperature distribution that its bottom portion is maintained at a temperature of not more than 30° C., and the upper part of its side wall portion is maintained at the temperature of 40° to 80° C.

* * * * *